United States Patent [19]

Ogawa et al.

[11] Patent Number: 4,788,638
[45] Date of Patent: Nov. 29, 1988

[54] DATA TRANSFER APPARATUS BETWEEN INPUT/OUTPUT DEVICES AND MAIN STORAGE WITH CHANNEL DEVICES BEING OF A CONCENTRATED TYPE AND STAND-ALONE TYPE

[75] Inventors: Tetsuji Ogawa; Tadashi Sato; Kazuhiko Ninomiya; Hideaki Shibata; Ryo Yamagatu, all of Hadano, Japan

[73] Assignee: Hitachi, Limited, Tokyo, Japan

[21] Appl. No.: 940,621

[22] Filed: Dec. 11, 1986

[30] Foreign Application Priority Data

Dec. 13, 1985 [JP] Japan .................................. 60-278904

[51] Int. Cl.⁴ .............................................. G06F 3/00
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 4,065,810 | 12/1977 | Cramer et al. | 364/200 |
| 4,067,059 | 1/1978 | Derchak | 364/200 |
| 4,272,815 | 6/1981 | Kadowaki et al. | |
| 4,479,179 | 10/1984 | Dinwiddie, Jr. | 364/200 |
| 4,494,194 | 1/1985 | Harris et al. | 364/200 |

*Primary Examiner*—Eddie P. Chan
*Attorney, Agent, or Firm*—Kenyon & Kenyon

[57] ABSTRACT

An apparatus transfers data between a plurality of input/output (I/O) devices and a main storage unit and includes a plurality of channel devices and a channel control unit. Each channel device is provided with a first data buffer for holding data to be transferred to and transferred from an I/O device. The channel control unit has an address register and a second data buffer. An address register is provided for each channel device, and holds an address of the main storage unit at which address the data to and from the I/O device is stored, and the second data buffer holds the data to be transferred to and transferred from the I/O device, which data is accessed based on the address designated by the address register. A data bus is connected between the first and second data buffers, the data bus having a bit capacity larger than that for data transfer between the I/O device and the channel device.

9 Claims, 4 Drawing Sheets

DATA TRANSFER APPARATUS BETWEEN INPUT/OUTPUT DEVICES AND MAIN STORAGE WITH CHANNEL DEVICES BEING OF A CONCENTRATED TYPE AND STAND-ALONE TYPE

BACKGROUND OF THE INVENTION

The present invention relates to a data transfer apparatus, and more particularly to a data transfer apparatus suitable for performing data transfer between input-/output (I/O) devices and a main storage unit.

An old stand-alone type channel device such as an IBM 2880 Block Multiplexer Channel has given way to a recent so-called, concentrated type channel device such as that disclosed in U.S. Pat. No. 4,272,815 (JP-B-58-6173). A concentrated type channel device is of great advantage due to miniaturization of its dimensions.

However, with a conventional concentrated type channel system, there are some disadvantages associated with (1) the processing capability of a common control unit and (2) adverse effects of the common control unit upon a plurality of channels at a time regardless of the essential independence of each individual channel.

Specifically, as to the former disadvantage (1), a data transfer between a concentrated type channel device and a common control unit is time-divisionally performed in units of one or two bytes which is the byte length for use in data transfer between the channel device and the common control unit. The common control unit collects 32 bytes of data from the channel device at the transfer rate of 1 or 2 bytes per transfer. The 32 byte unit collected device in units of 32 bytes, which is the byte length for use in data transfer between the common control unit and a main storage unit. The common control unit delivers the 32-byte data to the main storage unit. Consequently, the greater the number of channel devices to be controlled and the more the data transfer rate of each channel device becomes quick, the more difficult it becomes to improve the performance of the system due to the data transfer rate between the common control unit and the channel device.

As to the second disadvantage, since the common control unit collectively fetches data from a plurality of channel devices, any trouble in a circuit portion (data buffer) of the common control unit functioning to collectively fetch the data causes an adverse effect upon the plural channel devices at the same time.

SUMMARY OF THE INVENTION

It is an object of the present invention to provide a data transfer apparatus including a channel device of a concentrated type together with beneficial independence of a stand-alone type channel device.

It is another object of the present invention to provide a data transfer apparatus wherein the byte length for use in data transfer between the channel device and the common channel control unit is made larger by collectively fetching data from the I/O device in units of plural bytes, thereby eliminating the prior art problem regarding the data transfer rate.

It is a further object of the present invention to provide a data transfer apparatus wherein each channel device is separately provided with a data buffer so that if a problem arises in a data buffer of one channel device will not adversely affect the other channel devices.

It is still further object of the present invention to provide a data transfer apparatus wherein data transfer control for a main storage unit is carried out collectively by the common control unit so that the beneficial performance of a conventional concentrated control type channel device can be retained as it is.

The above objects are achieved in such a way that a common channel control unit with various data transfer control functions performs a data buffer control separately and independently for each channel device, and performs a data transfer control of the main storage unit collectively.

Specifically, according to the invention, each channel device is provided with a first data buffer for holding data to be transferred to and ransferred from an I/O device. The channel control unit has a holding means and a second data buffer. The holding means is provided for each channel device, and holds an address of a main storage unit at which address the data for transfer to and or transferred from the I/O device is stored. The second data buffer holds the data to be transferred to and transferred from the I/O device which data is accessed based on the address designated by the holding means. A data bus between the first and second data buffers has a capacity for a greater number of bits than the bit length for use in data transfer between the channel device and the I/O device.

DESCRIPTION OF THE PREFERRED EMBODIMENTS

Figure 1:
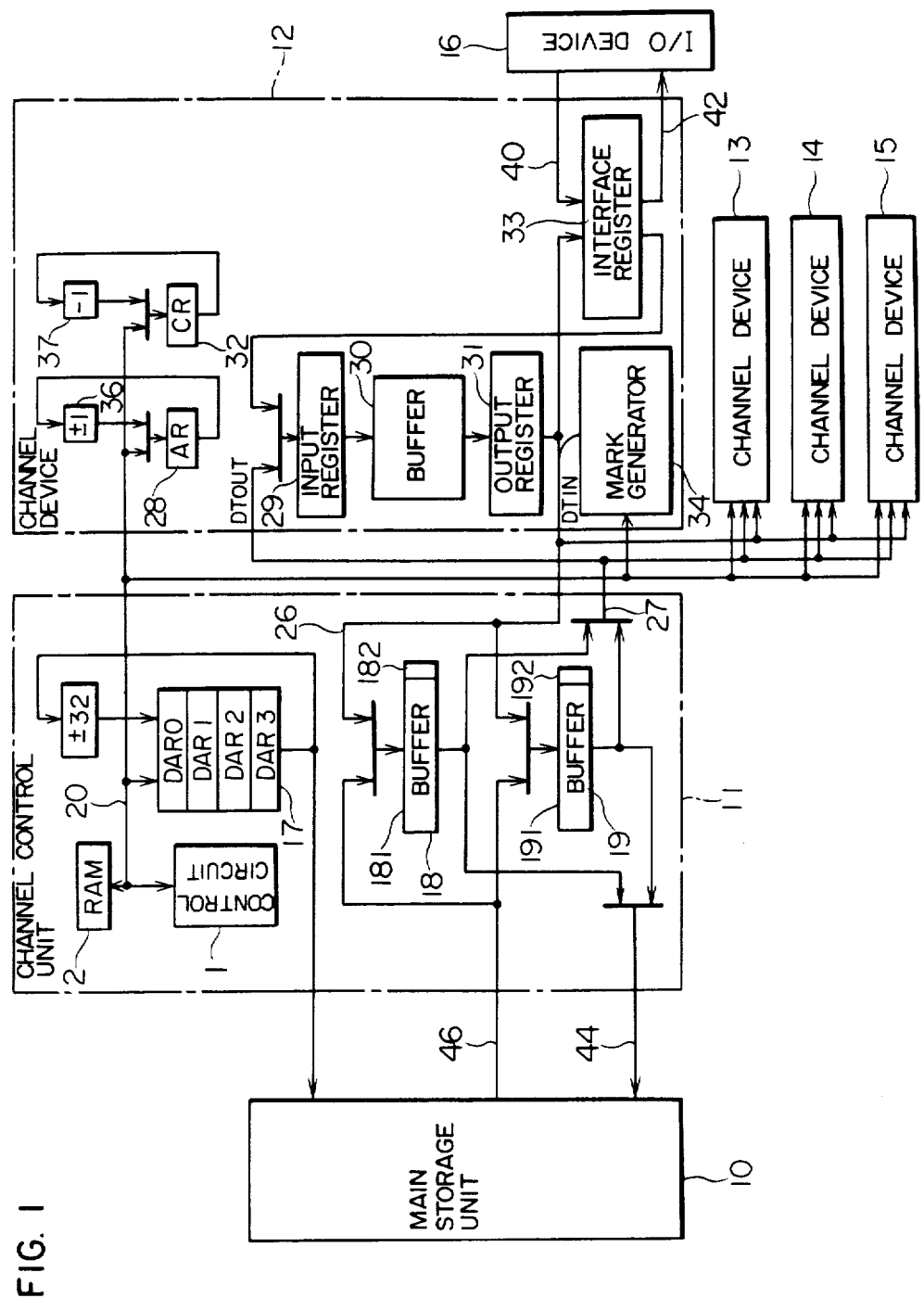
FIG. 1 is a block diagram of an embodiment of a data transfer apparatus according to the present invention, wherein a channel control unit and channel devices are shown connected between I/O devices and a main storage unit.

FIG. 1 is a block diagram showing the construction of an embodiment of a data transfer apparatus according to the present invention. Channel devices 12 to 15 each have the same hardware configuration. A channel control unit 11 time-divisionally controls the channel devices 12 to 15. The channel control unit 11 is also connected to a main storage unit 10 for data transfer therebetween. Each of channel devices 12 to 15 is connected to a corresponding I/O device for data transfer therebetween (in FIG. 1 only the I/O device 16, connected to the channel device 12, is shown, representing the other I/O devices).

First, the channel control unit 11 will now be described.

The channel control unit 11 has data address registers 17, individually registers DAR 0 to DAR 3, corresponding to the channel devices 12 to 15, respectively. Each data address register holds a data address, and the corresponding channel device accesses the main storage unit 10 based on the storage data address.

A control circuit 1 controls, in accordance with a microprogram stored therein, the channel control device 11 and interface signals (which will be described later with FIG. 2) for use with data transfer between the channel control circuit and the I/O devices. The control circuit 1 further reads a data address from RAM 2 and sets it via a control bus 20 to a data address register 17.

Data buffers 18 and 19 of the channel control unit are used for data transfer between the channel devices and the main storage unit, and each of these data buffers can store data of a 32-byte block size and a MARK, to be described later, at areas 181 or 191 and 182 or 192, respectively. The quantity of 32 bytes corresponds to the amount of data which can be transferred between the channel device and the main storage unit by one data transfer operation of the present invention. In this embodiment, two data buffers 18 and 19 are used in order to enable simultaneous (parallel) processing of read and write operations, but a single data buffer may suffice depending on the system performance.

The channel device 12 includes a data buffer 30 of 64 bytes, an address register 28, and a count register 32. The address register 28 holds the lower 6 bits of a data address supplied via the control bus 20. These lower 6 bits match the 64-byte capacity of the buffer 30 so that all addresses of the data buffer 30 can be identified by the content of the address register 28. The count register 32 holds the number of bytes of the data to be transferred, this number being supplied via the control BUS 20. An interface register 33 is used for data transfer between the channel device 12 and the I/O device 16.

A MARK generator 34 generates a MARK indicative of which byte or bytes among the 8 bytes of data to be transferred from the channel device 12 is valid. The MARK can be obtained based on the lower 6 bits of a data address supplied to the address register and the number of data bytes supplied to the count register, respectively supplied via the control bus 20. For instance, assuming that the lower 6 bits are $(000011)_2$ and the number of data bytes is 24, then a MARK indicative of a first 8-byte group of data to be transferred to the channel control device is $(00001111)_2$. This means that data of the first 4 bytes from the top address of the buffer 30 are invalid because the data of interest has been stored in the buffer 30 at the area starting from the address $(000011)_2$. Thus, the first four bits of the MARK are made "0" in order to invalidate the first four bytes of the first 8 byte data. All data bytes to be transferred at the second and third data 8-byte data transfer operations are valid so that the MARKs for these two transfers $(11111111)_2$. The MARK for the data to be transferred at the fourth data transfer operation becomes $(11110000)_2$ because the 24-byte data stored in the buffer 30 is located at an area starting from the address $(000011)_2$. That is, the data of the last 4 bytes, locations 28 to 31, is to be ignored because the data of interest is stored in the byte locations 4 to 27.

Within the channel control unit control bus 20 has a number of bits sufficient for holding all the bits of a data address within the channel control unit, but between the channel control unit 11 and the channel devices it has a bit length of six bits. By changing the number of bits of the control BUS 20 inside and outside the channel control unit 11 to have a smaller bit number outside the channel control unit, the number of pins is advantageously reduced when the channel control unit and the channel device are each manufactured as a separate LSI.

Figure 2:
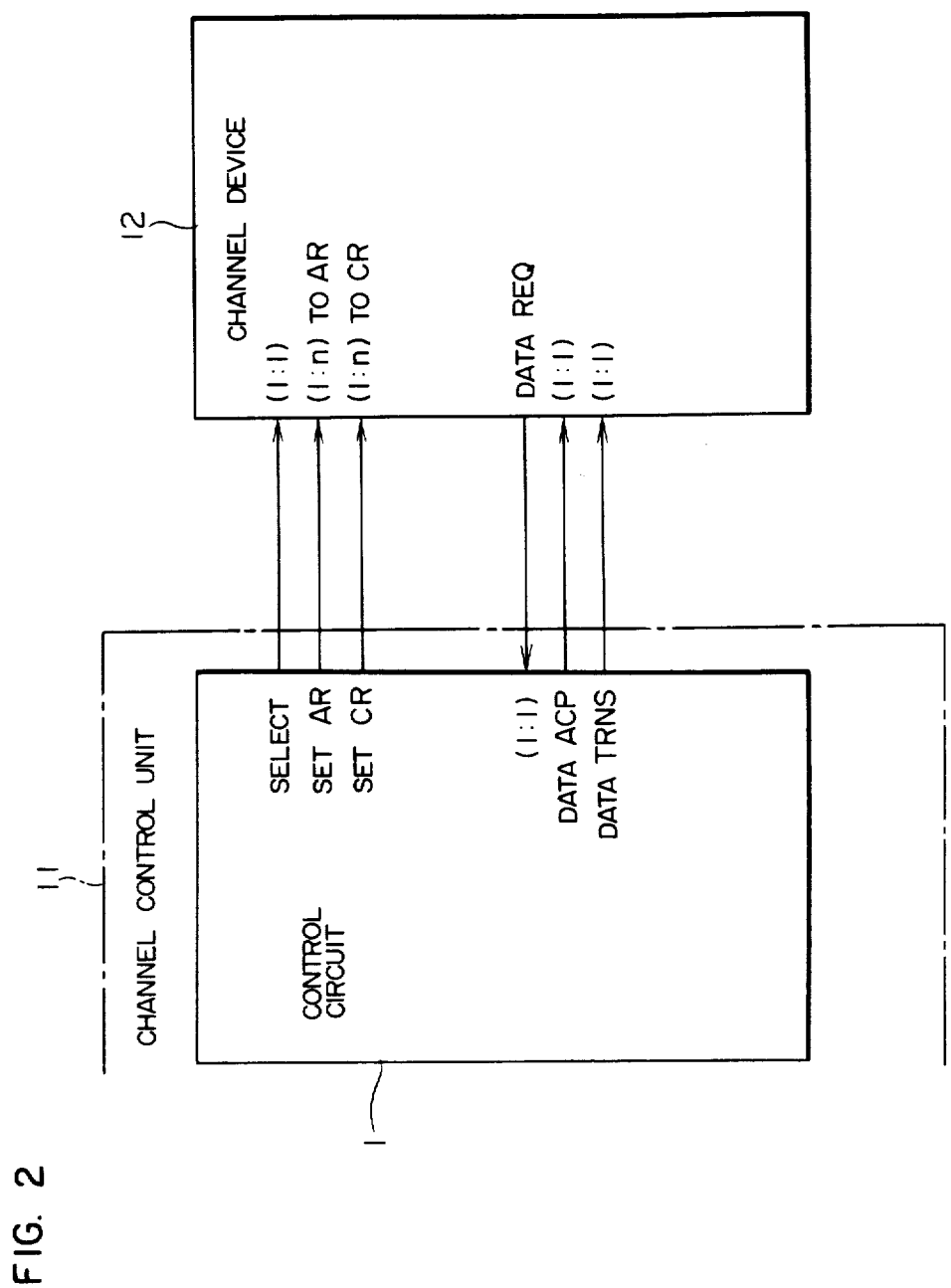
FIG. 2 shows the other interface signal lines not shown in FIG. 1, connecting the channel devices and the channel control unit.

FIG. 2 shows the other interface signal lines connecting the channel control unit 11 and the channel device 12, not shown in FIG. 1. The interface signal lines shown in FIG. 2 are only those necessary for explaining the operation of the present invention. Each interface signal is sent in the direction indicated by arrow. In the figure, (1:1) means that the interface signal concerned is assigned to each of the channel devices, while (1:n) means that the interface signal is commonly used for plural (in this embodiment, four) channel devices.

Next, each interface signal will be described briefly.

SELECT . . . a signal for selecting one of the plural channel devices.

SET AR . . . a signal supplied from the control circuit 1 to each address register of the channel devices, and indicating a timing when a data address on the control bus 20 is stored in the address register (AR) 28. This signal is valid only for the address register of the channel device selected by the SELECT signal.

SET CR . . . a signal supplied from the control circuit 1 to each count register of the channel devices, and indicating a timing when the number of data bytes on the control bus 20 is stored in the count register (CR) 32. This signal is valid only for the count register of the channel device selected by the SELECT signal.

DATA REQ . . . a signal supplied from the address register and the count register to the control circuit 1, and set when the address register reaches a predetermined value or when the counter register becomes 0. This signal requests to send data of the data buffer 30 to the channel control unit 11.

DATA ACP . . . a signal supplied from the control circuit to the buffer 30 and the address register, and accepting a data transfer of the buffer in response to the DATA REQ signal. The DATA REQ signal of the address register is reset by this DATA ACP signal.

DATA TRNS . . . a synchronizing signal supplied from the control circuit 1 to the buffer 30, and for receiving data from the channel device. 8 byte data is read from the buffer 30 when this signal is "ON".

Figure 3:
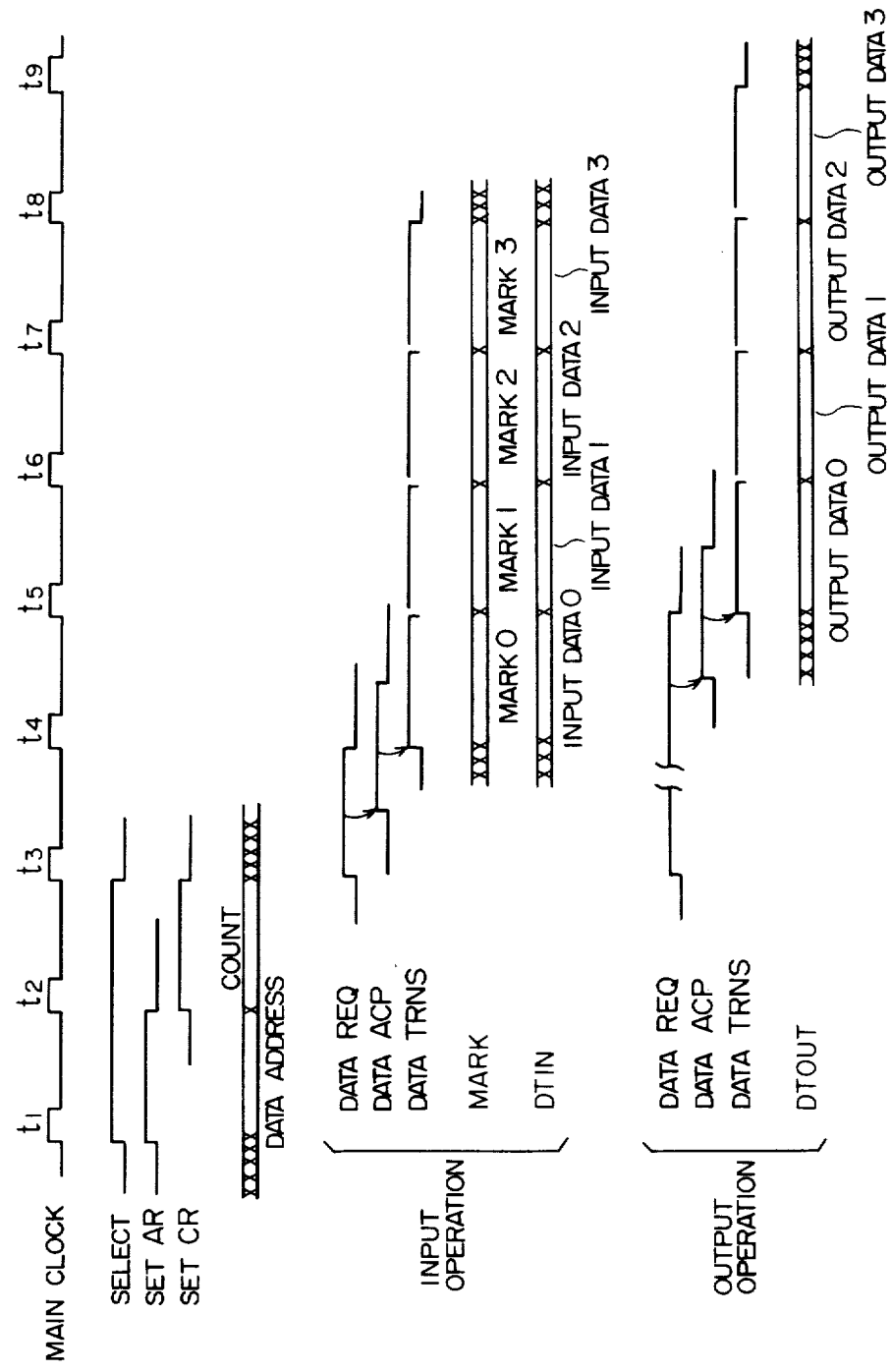
FIG. 3 is a timing chart of interface signals for the channel control unit and the channel devices.

Next, the operation or data transfer between the channel control unit and the channel device of this embodiment will be described with reference to the timing chart shown in FIG. 3.

Prior to data transfer between the I/O device 16 and the channel device 12, the control circuit 1 of the channel control device 11 delivers a data address stored in RAM 2 onto a control bus 20 and stores it in the data address register (DAR 0) corresponding to the channel device concerned. Simultaneously therewith, a part (lower 6 bits) of the data address on the control bus 20 is stored in the address register 28 of the channel device 12 (at timing $t_1$). At this time, a SELECT signal and a SET AR signal are sent to the channel device 12 which synchronously receives a part of the data address on the control bus 20. The channel control unit 11 then sends a count value indicating the number of data bytes which have been transferred. The channel device 12 stores the count value it in the count register 32 (at timing $t_2$). When storing the number, a SET CR signal is used as a synchronizing signal. Next, the input and output operations will be described separately.

(1) Input Operation

The input operation refers to a data transfer operation from the I/O device 16 to the main storage unit 10.

As data is sent in units of one byte from the I/O device 16 to the interface register 33 through a one-byte data bus 40, the interface register 33 transfers the data to an input register 29 of the input buffer 30 to store it in the input buffer 30 at an address indicated by the address register. At this time, the contents of the address counter 28 and the count register 32 are renewed by adder-subtracters 36 and 37, respectively. The address register 28 is incremented by 1 during the forward input operation, whereas it is decremented by 1 during the backward input operation. In both forward and backward input operations, the count register 32 is decremented by 1. Every time data is transferred from the I/O device 16, the above operations are repeated but a new control operation is effected when the following conditions are met.

(1) When the content of the address register 28 becomes $(x00000)_2$ during the forward input operation or $(x11111)_2$ during the backward input operation, i.e., when input data has been buffered to the amount corresponding to a 32-byte block of the main storage unit 10, the address register or counter 28 sets its DATA REQ signal at "1" in order to send the data block to the channel control unit 11 (at timing $t_3$). In response to the DATA REQ signal, the control circuit 1 of the channel control unit 11 sends back a DATA ACP signal on condition that either of the data buffers 18 and 19 is empty. This data ACP signal resets the DATA REQ signal of the address register 28 so that the buffer 30 is allowed to start a read operation. Further, a DATA TRNS signal serving as a synchronizing signal for receiving the data from the channel device 12 is made "1" (at timing $t_4$). In this embodiment, the byte length of a data input bus DTIN 26 that connects the channel device 12 and the channel control unit 11 is 8 bytes, and the byte length of the MARK signal is 1 byte. Therefore, it is necessary to send 8-byte data four times in order to send 32-byte data. Each 8-byte data unit is transferred at timings $t_5$ to $t_8$. The buffer 30 delivers an 8-byte data unit onto the input data bus DTIN 26 via an output register 31 every time it receives a DATA TRNS signal. The MARK generator 34 generates a MARK signal for each of the four 8-byte data units to be transferred, the MARK signal being delivered onto the data input bus DTIN 26. Data and MARK signal on the data bus DTIN 26 are stored in either one of the data buffers 18 and 19. During these operations, data from the I/O device 16 are sequentially written in the data buffer 30 at the area addressed by the address register 28. The above-described process (1) is executed every time the content of the address register 28 becomes $(x00000)_2$ or $(x11111)_2$.

(2) When the content of the count register 32 becomes "0", it means that no data to be transferred is present in the data buffer 30. Thus, data buffered in the data buffer 30 until such a time is sent to the channel control unit 11 in the same manner as by the procedure described above at (1).

When the data and MARK are stored in either of the data buffers 18 and 19, the control circuit 1 of the channel control unit 11 picks up the data address from the data address register (DAR 0) corresponding to the channel device 12 which sent the data. The data and the data address are sent to the main storage unit 10 through a 32-byte data bus 44. At this time, the content of the data address register (DAR 0) is incremented by 32 in case of a forward input operation and decremented by 32 in case of a backward input operation.

(2) Output Operation

The output operation means a data transfer operation from the main storage unit 10 to the I/O device 16.

In the output operation, the channel device 16 first requests a data pre-fetch. Similarly to the case of the input operation, the channel device 16 outputs a DATA REQ signal "1" to the channel control unit 11 (at timing $t_3$). Then, the channel control unit 11 picks up a data address of the main storage unit 10 from the data address register (DAR 0) corresponding to the channel device 12 which requested a data pre-fetch. 32 byte data is read from the main storage unit 10 through a 32-byte data bus 46 based on the picked-up data address and is stored in an empty data buffer 18 or 19. When the data is entirely stored in the empty data buffer 18 or 19, the control circuit 1 of the channel control unit 11 sends a DATA ACP signal to the channel device 12 (at timings $t_4$ to $t_5$) and thereafter, delivers the output data onto a data output bus DTOUT 27 in synchronism with a DATA TRNS signal (at timings $t_5$ to $t_8$). The byte length of the data output bus DTOUT 27 is 8 bytes so that a 32-byte data block is transferred by sending 8-byte data four times. At the end of the 32-byte data block transfer, the content of the data address register (DAR 0) is incremented by 32 by an adder-subtracter 21. The data on the data output bus DTOUT 27 is stored in the data buffer 30 via the input register 29. At the start of a data transfer to the input/output device, the data buffer 30 of 64 bytes is contains data fetched from the main storage unit 10. When the I/O device 16 issues a data read request, the channel device 12 reads one-byte data from the data buffer 30, transfers it to the interface register 33, and sends it the I/O device 16 through a one-byte data bus 46.

Every time data is read from the data buffer 30, the content of the address register 28 is incremented by 1 and that of the count register 32 is decremented by 1. When the content of the address register 28 becomes $(x00000)_2$, the channel device 12 issues a data pre-fetch request to the channel control unit 11.

As appreciated from the foregoing description of the embodiment, although the byte length of a data bus between the I/O device 16 and the channel device 12 is in the order of 1 byte or so, the byte length of a data bus between the channel control unit 11 and the channel device 12 is 8 bytes. Consequently, a data transfer rate between the channel control unit 11 and the channel device 12 is improved as compared with that of a conventional concentrated control type channel device.

Figure 4:
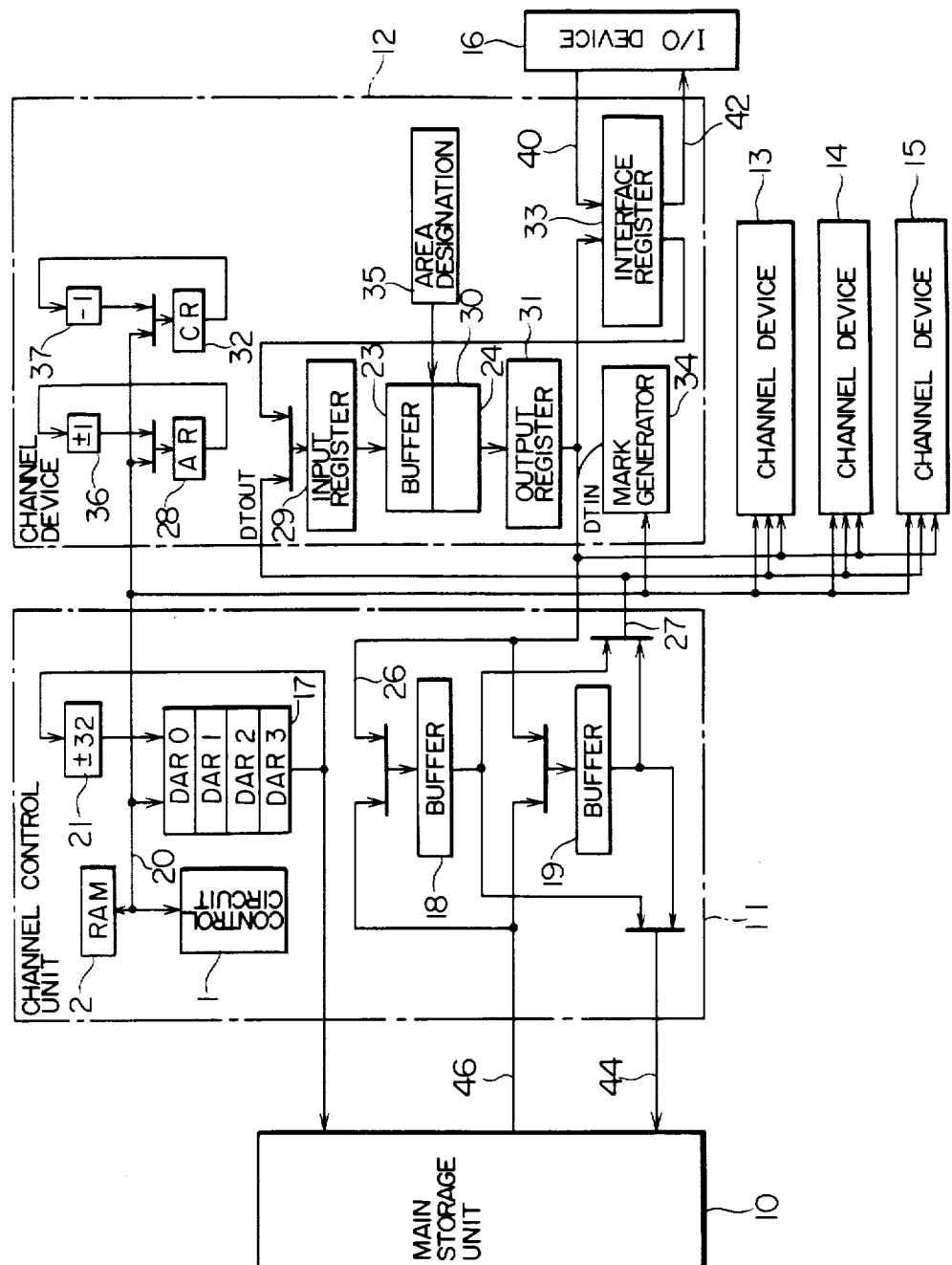
FIG. 4 is a block diagram of another embodiment of a data transfer apparatus according to the present invention, wherein there is provided a circuit which notifies the channel device of the buffer area to be used.

Another embodiment of the present invention will be described with reference to FIG. 4. In the embodiment, the number of bits of the control bus 20 is 5. These 5 bits correspond to the 32-byte length of a data bus between the channel control unit 11 and the main storage unit 10. The data buffer 30 of the channel device 12 is divided into an upper 32-byte area 23 and a lower 32-byte area 24. The channel device 12 has a circuit 35 which designates into which area 23 or 24 data from the input register 29 is written, or from which area 23 or 24 data is read out to output it to the output register 31.

The operation of this embodiment is basically the same as that of the previously-described embodiment. The circuit 35 changes a designating area when the address register 28 becomes in an underflow state or an overflow state.

Specifically, when the content of the address register 28 reaches $(0000)_2$ during a forward input operation or $(1111)_2$ during a backward input operation, the circuit 35 changes the area 23 or 24, into which data from the I/O device 16 has been buffered, to the area 24 or 23 which in turn is used in data transfer to the channel control unit 11.

Alternatively, during an output operation, when the content of the address register 28 reaches (0000)₂, the circuit 35 changes the area 23 or 24, by which data from the channel control unit 11 has been received, to the area 24 or 23 which in turn is used in data transfer to the I/O device 16.

According to this embodiment, the number of bits of the control bus is reduced by one bit as compared with the preceding embodiment. The number of pins is advantageously reduced when the channel control unit 11 and the channel device 12 are each configured as a separate LSI.

According to the present invention, data transfer between the channel device and the channel control unit can be performed collectively in units of plural bytes. Thus, the channel control unit can readily manage a time-divisional data transfer control of the plural channel devices.

What is claimed is;

1. A data transfer apparatus for transferring data between a main storage unit and a plurality of input-/output devices, comprising:
   a plurality of channel devices, each of said plurality of channel devices including:
      a first data buffer for holding data to be transferred to and transferred from an input/output device, and
      an address register for storing an address of said first data buffer;
   a channel control unit, said channel control unit including:
      a plurality of address holding means, each one connected to one of each said address register, one address holding means corresponding to each channel device, for holding an address of a main storage unit at which address data to be transferred to and transferred from the input-/output device is stored, wherein said address register holds a copy of lower bits of said address stored in said address holding means, and
      a second data buffer said second data buffer holding the data to be transferred to and transferred from the input/output device which data is accessed based on the address designated by said address holding means;
   a first data bus for data transmission between said first data buffer and the plurality of input/output devices; and
   a second data bus for data transmission between said first and said second data buffers, said second data bus having a larger transfer capacity than that of said first data bus.

2. A data transfer apparatus according to claim 1, wherein said second data bus has a byte length as large as that obtained by multiplying an integer number times a byte length of said first data bus.

3. A data transfer apparatus according to claim 1, wherein said second data buffer has two areas, one of said areas storing a data from said first data buffer, while in the other area data is transferred to said main storage unit.

4. A data transfer apparatus according to claim 1, wherein said plurality of channel devices and said channel control unit are respectively formed in different integrated circuit.

5. A data transfer apparatus according to claim 1, wherein said channel device further includes,
   means for updating a value held by said address register each time a data unit is stored in said first data buffer, and
   means for sending a data transfer request to said channel control unit each time said value held by said address register becomes a predetermined value.

6. A data transfer apparatus according to claim 5, wherein said channel device further includes,
   a count register for holding the number of bytes of a data to be transferred; and
   means for decrementing a value held by said count register each time a data unit is stored in said first data buffer wherein means for sending a data transfer request to said channel control unit also sends a transfer request when the value held by said count register indicates that all data to be transferred have been stored in said first data buffer.

7. A data transfer apparatus according to claim 6, wherein said channel device further includes means, receiving an address of said main storage unit and the number of bytes of a data to be transferred, for sending to said channel control unit, a signal indicating which byte of a data to be transferred from said second data bus is valid, in synchronism with transfer of said data.

8. A data transfer apparatus comprising:
   a plurality of channel devices wherein each of said plurality of channel devices includes:
      a first data buffer for receiving data from an I/O device in units of a first byte length and sending data to the I/O device in units of said first byte length, and
      an address register for storing an address of said first data buffer; and
   a channel control unit, said channel control unit including:
      a plurality of holding means each being provided for each channel device, and each being coupled to said address register of said channel device for holding an address of a main storage unit at which address the data to be transferred to and transferred from the I/O device is stored, wherein said address register holds a copy of lower bits of said address held in said holding means, and
      a second data buffer, said second data buffer receiving data from one of the channel devices in units of a second data byte length and sending data to one of the channel devices in units of said second byte length, which data is accessed based on the address designated by said holding means, said second data buffer receiving data from the main storage unit in units of a third byte length and sending data, received from one of said channel devices, to the main storage unit in units of said third byte length; and wherein said second byte length is larger than said first byte length, and said third byte length is larger than said second byte length.

9. A data transfer apparatus comprising:
   a plurality of channel devices wherein each channel device receives data of a first bit width from a corresponding I/O device, each of the plurality of channel devices including:

an address register, first buffer for storing, beginning at an address designated by said address holder means, the data of a first bit width from the I/O device, and, means for reading out data of a second bit width from the first buffer, wherein the data of the second bit width have a larger number of bits than the data of the first bit width;

a channel control unit said channel control unit including:

a plurality of first address holding means, each first address holding means corresponding to one of the channel devices and being coupled to said address register of said one channel device, for holding an address of a main storage unit at which data from the corresponding channel device is stored, wherein said address register holds a copy of the lower bits of said address held in said first address holding means, and a second data buffer, accessed based on the address designated by the first address holding means, for storing data received from the channel device;

a first data bus having a large enough bit width to carry data of the first bit width in a parallel fashion as a data transmission between the first data buffer and the I/O device; and a second data bus having a large enough width to carry data of the second bit width in a parallel fashion as a data transmission between the first and second data buffers wherein the second data bus has larger bit capacity than that of the first data bus.

* * * * *